United States Patent

Van Assendelft

[11] 3,880,759
[45] Apr. 29, 1975

[54] BLOOD DIALYZER

[75] Inventor: Leendert Van Assendelft, Arnhem, Netherlands

[73] Assignee: Organon Teknika B.V., Oss, Netherlands

[22] Filed: Mar. 26, 1973

[21] Appl. No.: 345,067

[30] Foreign Application Priority Data
Mar. 24, 1972 Netherlands ............... 7204023
Mar. 24, 1972 Netherlands ............... 7204024

[52] U.S. Cl. ............................ 210/194; 210/321
[51] Int. Cl. ............................ B01d 13/00
[58] Field of Search ......... 210/321, 194; 206/63.2 R

[56] References Cited
UNITED STATES PATENTS

| | | | |
|---|---|---|---|
| 3,342,328 | 9/1967 | Swenson | 206/63.2 R |
| 3,484,369 | 12/1969 | De Dobbeleer | 210/321 X |
| 3,489,647 | 1/1970 | Kolobow | 210/321 |
| 3,508,662 | 4/1970 | Miller | 210/321 |

*Primary Examiner*—Frank A. Spear, Jr.
*Assistant Examiner*—Ferris H. Lander
*Attorney, Agent, or Firm*—Stevens, Davis, Miller & Mosher

[57] ABSTRACT

A blood dialyzer has a housing enclosing a blood compartment and a compartment for dialysis fluid separated by a semi-permeable membrane, inlet and outlet to each compartment, a tube connected between the inlet and outlet of the latter compartment, means for circulating dialysis fluid through the compartment and the tube and means for removing fluid from the circuit and for adding fresh fluid. Air in the compartments may be purged therefrom with a water soluble gas.

3 Claims, 6 Drawing Figures

BLOOD DIALYZER

This invention relates to a blood dialyzer having a housing enclosing at least one semi-permeable membrane which divides the inside of the housing into at least one blood compartment and one dialysis compartment, which compartments are provided with inlets and outlets.

With a known construction of the type indicated above, which is used as an artificial kidney, the blood to be purified is taken from an artery of a patient suffering from kidney failure and flows between the coils fo a spirally wound tubular membrane through which dialysis fluid is passed. The membrane is preferably of cellulose made by the cuprammonium process, known under the trade name "Cuprophan." As is known, the low molecular weight waste materials such as urea and creatinine contained in the blood to be purified pass through the membrane, after which they are removed by the dialysis fluid. Upon leaving the dialyzer, the purified blood is fed back into a vein of the patient under treatment.

In a variation of the type of blood dialyzer indicated above the blood flows through the tubular membrane, whereas the dialysis fluid is caused to flow between the various coils of the spirally wound membrane.

In both known constructions, the dialyzer is disposed in a closed housing which has at least two compartments separated by the tubular membrane, namely a blood compartment for the blood to be purified and a dialysis compartment for the dialysis fluid.

Neither of these known constructions has found wide application as an artifical kidney. Instead, use has for long been made of artificial kidneys having an open dialysis compartment. In that case the membrane coil is located in a cylindrical housing. The dialysis compartment formed therein is open both at the top and at the bottom of the housing. This artifical kidney is placed in a reservoir or canister containing dialysis fluid. The dialysis fluid is pumped between the coils of the membrane in an axial direction by means of a dialysis pump and leaves the house at the top from where it flows back into the canister.

Apart from being costly, this known construction has the disadvantage that the canister as well as the dialysis pump must be carefully cleaned and sterilized after each dialysis. This must be done in order to avoid cross infection during the dialysis of the next patient to be treated. This partly accounts for the kidney dialysis being a time-consuming treatment which, moreover, requires a great deal of skill.

It is therefore an object of this invention to provide a blood dialyzer which does not require a cannister. A further object of the invention is to provide a blood dialyzer with accessable disposable components which permits repeated use of the dialysis pump without intermediate cleaning and sterilization thereof. Another object of the invention is to provide a blood dialyzer having a simplified system for recirculation of dialysis fluid. Still another object of the invention is to provide a dialyzer which does not require removal of air before it can be used.

The objects of the invention are accomplished by providing a dialyzer with a tube external of the dialyzer which connects the inlet to the compartment containing dialysis fluid with the outlet from the compartment and which is also connected to a source of fresh dialysis fluid and to a receptacle for spent fluid. Fluid may be removed from this external tube adjacent to the outlet from the dialysis compartment and may be charged to the system adjacent to the inlet to the compartment. In another embodiment of the invention, the dialysis compartment is filled with a gas soluble in blood to purge air therefrom.

The blood dialyzer thus obtained makes it possible to use a highly simplified recirculation system. To this end the dialyzer provided by the invention comprises a tubing pump which cooperates with the external tube used to recirculate dialysis fluid.

To permit recirculation, it is only necessary to place the external tube in a tubing pump. With the aid of the tubing pump the dialysis fluid can be pumped through the dialysis fluid circuit formed by the dialysis compartment and the external tube between inlet and outlet to the dialysis compartment.

Through one of the side connections on the external circulating tube, fresh dialysis fluid can be fed to the dialysis fluid circuit; and through the other side connection per unit of time the same amount of spent dialysis fluid can be discharged from the dialysis fluid circuit.

A preferred construction of the blood dialyzer according to the invention is characterized in that in the recirculation system formed by the dialysis compartment and the dialysis fluid tube there is provided at least one adjustable constriction.

The blood dialyzer may be one of a flat construction in which the housing is fomed by two semi-rigid plastic plates containing flat membrane sheets between which a flow of blood can be maintained. But the invention is particularly suitable to be applied to a blood dialyzer provided with a tubular semipermeable membrane wound around a core.

The invention also relates to a blood dialyzer having a housing which encloses at least one semi-permeable membrane which divides the inside of the housing into at least one blood compartment and one compartment for dialysis fluid, which compartments are provided with inlets and outlets for respectively the supply and the discharge of dialysis fluid to and from the dialysis compartment.

The inlets and outlets through which blood and dialysis fluid may be fed into and discharged from the dialyzer may be formed by the inlets and outlets of the two compartments themselves or be formed by the free ends of the tubes projecting from the housing and connected to the respective compartment.

Before a blood dialyzer can be connected to a patient, all air must be removed from the blood compartment and the dialysis compartment. This is rather time-consuming and calls for skilled personnel, particularly when use is made of blood dialyzers with a coiled membrane construction. Air left in the dialyzer and in contact with the membrane reduces the effective dialysis surface and, consequently, also the final effect of the treatment.

The long preparation time is also disadvantageous in situations calling for immediate use, for example in cases where the dialysis must be interrupted on account of leakage of the membrane. Then the patient must as soon as possible be connected to a new artificial kidney.

An embodiment of the blood dialyzer provided by the invention avoids these problems. It is characterized in that the inlet and the outlet connections for the blood and the dialysis fluid are sealed from the environment and in that both the blood and the dialysis compartments are filled with a gas which is properly soluble in water.

By delivering the dialyzer filled with gas there is no longer need for the air to be evacuated from it prior to dialysis. The air can be removed from it when during manufacture it is filled with gas.

The filling gas must be properly soluble in water in order to allow it to be removed when the dialyzer is rinsed before it is put into use. Ammonia gas is very suitable because apart from being properly soluble in water it acts as a disinfectant. Another particularly suitable gas is carbon dioxide. This gas is properly soluble in blood and does not cause any inconvenience, so that there is no absolute need for it to be completely removed prior to the dialysis.

A preferred construction of the dialyzer provided by the invention is characterized in that it is provided with gas-filled blood and dialysis tubes connected with the blood compartment and the dialysis compartment, respectively. The actual blood compartment and the dialysis compartment as well as the tubes connected therewith are filled with the gas and are, consequently, free from air.

It is recommended that the blood dialyzer be packed in a plastic bag which is hermetically sealed.

It is preferred that the dialyzer packed in the plastic bag should be sterilized with the aid of gamma rays.

The invention will be described further with reference to the accompanying drawings, in which FIG. 1 shows one embodiment of a blood dialyzer with recirculation system provided by the invention;

Figure 1:
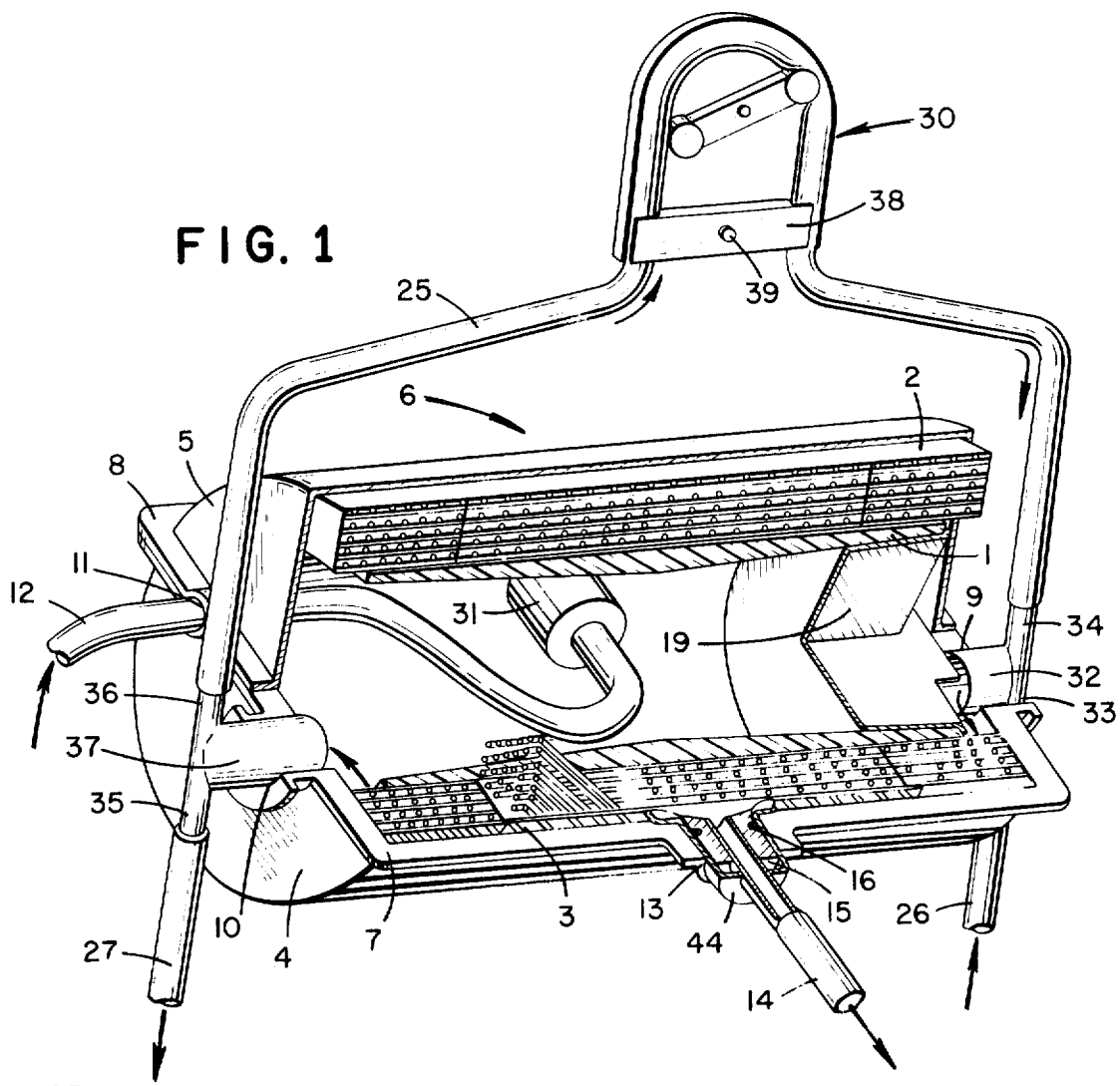

The blood dialyzer represented in FIG. 1 is formed by a hollow plastic core 1 on which a semi-permeable membrane tube 2 with supporting screen 3 is wound. The membrane tube 2 is made of "Cuprophan." The screen 3 is an extruded polyethylene screen of a generally known build-up.

The assembly of core 1, tube 2 and screen 3 is contained within a plastic housing 6 fabricated from two semi-cylindrical parts 4 and 5. The two halves 4 and 5 are provided with flanges 7 and 8 which are used to attach one half of the housing to the other, for instance by gluing or ultrasonic welding. The housing 6 has an inlet 9 and an outlet 10 for the dialysis fluid. Secured liquid-tight in the openings 9 and 10 are T-shaped connecting pieces 32 and 37. The connecting piece 32 has two tube connecting ends 33 and 34. The connecting piece 37 also is provided with two tube connecting ends 35 and 36. Placed on the ends 34 and 36 are the ends of a tube 25, which thus externally interconnects the inlet 9 and the outlet 10 of the compartment which contains dialysis fluid. Tube 25 is one which is suitable to be used with a tubing pump. This pump is indicated with the reference numeral 30. The pump is driven by a motor not shown in the drawing.

With cap 38 removed, the tube 25 can be readily placed in the housing of the pump 30. After the cap has been secured on the pump housing by means of a bolt 39, the tubing pump is ready for operation.

Connected to the tube ends 33 and 35 are two tubes 26 and 27. They form two side connections on the tube 25, which latter tube must be considered to comprise those parts of the connecting pieces 32 and 37 which connect the ends of the tube 25 to the compartment containing dialysis fluid.

The housing 6 is also provided with a passage 11 for a first blood tube 12 and a passage 13 for a second blood tube 14. The blood tubes 12 and 14 are polyvinyl chloride and are connected to the ends of a membrane tube 2. In order that the blood tube 12 may be connected to the membrane tube 2, the core 1 is provided with an opening in which sleeve 31 fits. The manner of connecting the blood tube 12 to the membrane tube 2 is the same as that for blood tube 14. The latter tube has at its end an annular plug 15 on which the one end of the membrane tube 2 is placed. The membrane tube 2 is placed on the plug 15 by means of a rubber ring 16 or a cord wound on tube 2. On the plug 15 is a sleeve 44 which is mounted in the wall of the housing 6. However, it is also possible for the sleeve to be formed integral with the housing.

Near the inlet 9 there is provided a partition 19 which separates the inside of the core 1 from the compartment containing dialysis fluid.

The membrane tube 2 divides the inside of the housing 6 into a blood compartment within the tube 2 and a compartment for the dialysis fluid outside tube 2.

Blood taken from an artery of a patient to be dialyzed is passed through the blood tube 12 to the blood dialyzer. After having passed through the membrane tube 2, the purified blood is reintroduced into the patient through the blood tube 14 connected to a vein.

The tubing pump 30 pumps the dialysis fluid through the recirculation circuit formed by the compartment containing dialysis fluid in housing 6 and tube 25. In order that the dialysis may be effective the dialysis fluid is pumped through the dialysis compartment at a relatively high rate of flow of about 5 liter per minute or more.

The spent dialysis fluid is withdrawn from the recirculation circuit, for instance at a rate of 0.5 liter per minute, through the side line in the form of the tube 27 connected to the recirculation circuit. At the same time, dialysis fluid is fed through the tube 26 to the recirculation circuit at the same rate of flow by means of a pump (not shown).

In the above-described way, it is possible with extremely simple means, without using a canister, to realize recirculation with part of the dialysis fluid being continuously refreshed. In addition to a reduction in cost it offers the advantage that the external part of the recirculation circuit need not be cleaned and sterilized. Not only the actual blood dialyzer, but also tube 25 with the connecting pieces 32 and 37 and tubes 26 and 27 are disposable.

The amount of water withdrawn from the blood by ultrafiltration can be adapted in a simple way to the individual needs of a patient by means of the dialyzer proposed. The withdrawal of water by ultrafiltration is dependent, on the one hand, on the difference in pressure between the blood compartment and the dialysis compartment and on the other hand on the duration of the dialysis.

In order to control the amount of water withdrawn from the blood per unit of dialysis time use may be made of an adjustable constriction in the recirculation circuit. If with the blood dialyzer illustrated in FIG. 1 this constriction is placed between the outlet 10 and tube 25, the pressure in the dialysis compartment is higher than the pressure of the dialysis fluid at the tube connection 35. If the pressure of the dialysis fluid at the latter point is assumed to be equal to atmospheric pressure, the pressure in the dialysis compartment is higher than atmospheric pressure.

This difference in pressure is dependent upon the setting of the constriction. As the pressure in the blood compartment must always be higher than that in the dialysis compartment, the difference in pressure between the blood compartment and the dialysis compartment will decrease as the pressure in the dialysis compartment is set to a higher value. This decrease in pressure will result in a lower ultrafiltration and, hence, in a smaller amount of water being extracted from the blood in a given dialysis time.

It is also possible for the pressure in the dialysis compartment to be reduced to below atmospheric pressure. As a result, the difference in pressure between the blood compartment and the dialysis compartment is increased, and consequently also the ultrafiltration.

In order to realize this reduction in pressure the direction of rotation of the tubing pump may be reversed or a constriction may be provided between the inlet 9 and tube 25. In the latter case tube 26 serves as a discharge channel and tube 27 as a feed channel for dialysis fluid.

The reduction in pressure in the dialysis compartment can also be effected by applying suction to the outflow end (tube 27), e.g. by means of a water-jet pump.

Figure 2:
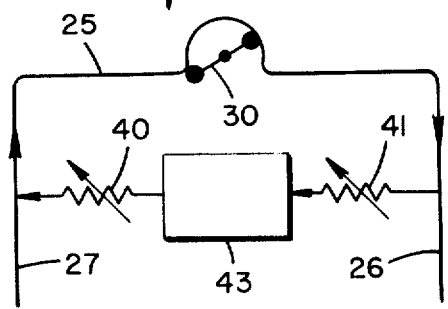
FIGS. 2 and 3 show two variations of the embodiment of FIG. 1.

It is preferred that a constriction be provided at either of the above-indicated points, so that there is no need to change the direction of flow of the dialysis fluid through the dialyzer. The arrangement is schematically represented in FIG. 2. In it the above-mentioned constriction are indicated with the numerals 40 and 41, respectively, and the dialyzer with 43.

Figure 3:
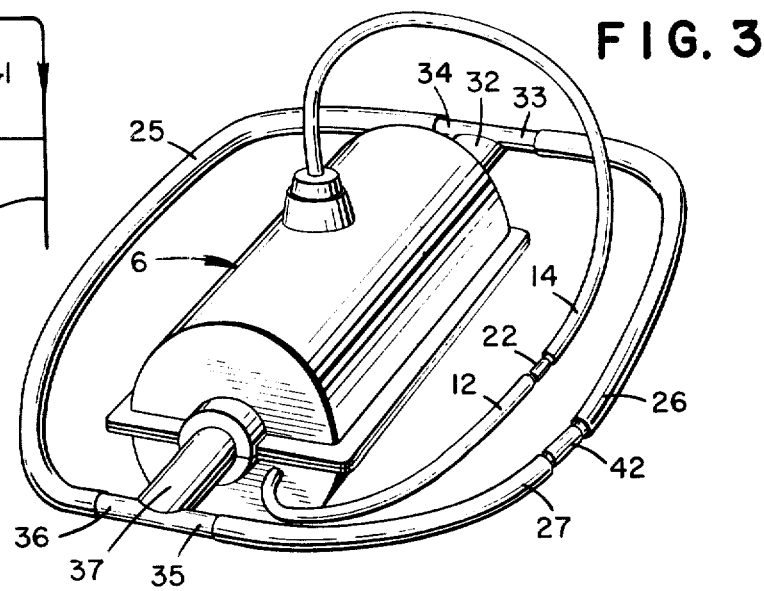

FIG. 3 shows in what state the blood dialyzer can be delivered. The ends of the blood tubes 12 and 14 and those of the tubes 26 and 27 are interconnected with hollow coupling members 22 and 42, respectively. In this way the inside of the dialyzer and the tubes connected to it are completely sealed off. The blood dialyzer with tubes is packed in a hermetically sealed plastic bag and sterilized in this state with, for instance, gamma rays. It is then ready for delivery.

Figure 4:
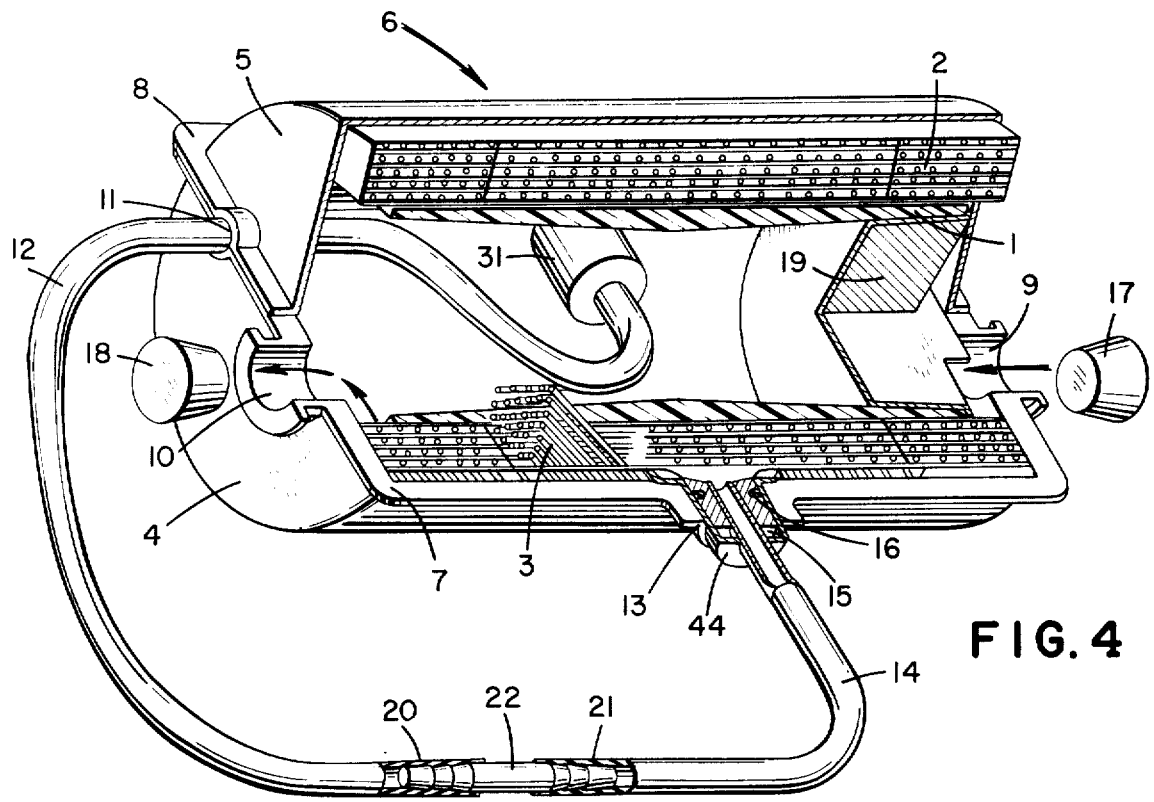
FIG. 4 illustrates an embodiment of a blood dialyzer provided by the invention which is delivered filled with a water-soluble gas.

In the construction according to FIG. 4 the housing 6 has an inlet 9 and an outlet 10 for dialysis fluid, which inlets are sealed by the plugs 17 and 18, respectively. The ends 20 and 21 of the blood tubes 12 and 14, respectively, are interconnected by means of a hollow coupling member 22.

The membrane tube 2 divides the inside of the housing 6 into a blood compartment within the tube 2 and a dialysis compartment outside tube 2. The blood compartment communicates with the continuous channel formed by the interconnecting blood tubes 12 and 14. The blood compartment (including the blood tubes 12 and 14) is filled with a water-soluble gas free from air. The dialysis compartment sealed with plugs 17 and 18 is filled with the same gas. The housing 6 must be of a material which is non-permeable to the gas used.

In this filled state, the blood dialyzer is packed in a plastic bag which is hermetically sealed. Thus packed the blood dialyzer is sterilized with the aid of gamma rays.

The delivery of the dialyzer in the gas-filled state has the great advantage that there is no longer need for the time-consuming and cumbersome deaeration. As a result, the dialyzer is ready for practically immediate use.

Figure 5:
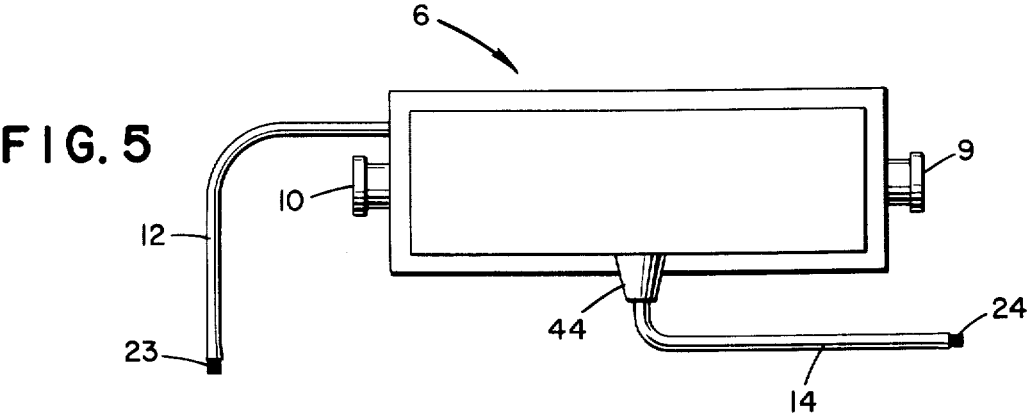
FIGS. 5 and 6 show two variations of the embodiment of the blood dialyzer of FIG. 4.

Instead of being interconnected, as shown in FIG. 4, by means of a coupling member 22, the blood tubes 12 and 14 may be mounted independently of one another and provided with plugs 23 and 24, respectively, as schematically shown in FIG. 5.

Prior to being taken into use, the dialyzer may be placed in a canister whose bottom is provided with an inlet for the dialysis fluid. The dialyzer is place with its inlet 9 on the inlet of the canister. Dialysis fluid can then be fed into the dialysis compartment through the inlet of the canister and the inlet 9 of the dialysis compartment by means of a dialysis pump. The dialysis fluid can leave through the outlet 10 and flow back into the canister.

Figure 6:
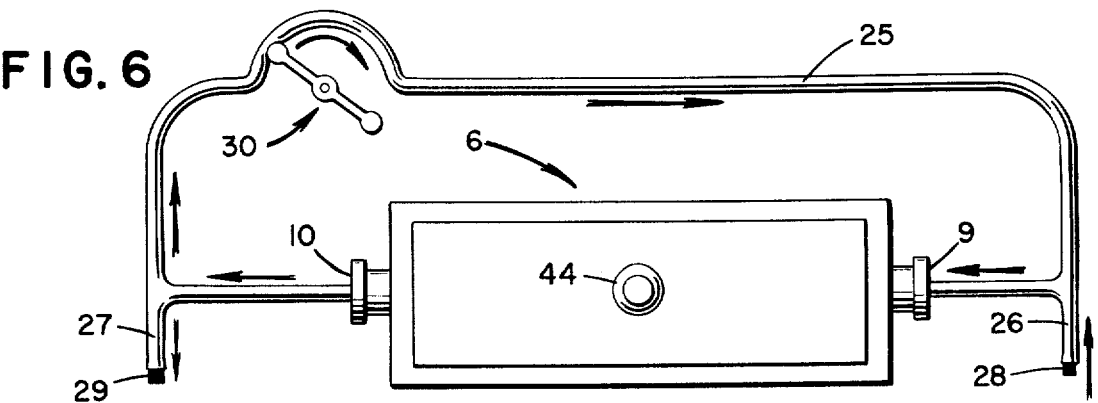

However, a simpler solution is offered by a dialyzer with recirculation system according to FIG. 1. The construction used to this end is schematically shown in FIG. 6. Tube 25 has two ends 26 and 27 which are plugged at 28 and 29, respectively. The dialysis compartment including the set of tubes 25–27 is delivered filled with gas.

Instead of being sealed respectively at 28 and 29, the tubes 26 and 27 may, when the dialyzer is delivered, of course be interconnected in the manner shown in FIG. 3.

Application of the invention is not restricted to the blood dialyzer with blood compartment within the membrane tube, as indicated in the drawing. It may also be used for a blood dialyzer in which the dialysis fluid flows through the membrane tube and the blood between the tube coils.

Although the invention is particularly suitable for blood dialyzers with coiled membrane tube, it may also be used for flat dialyzers of the disposable type provided with membrane film bordering one or more flat blood compartments.

Finally, although the blood dialyzer according to the invention forms a particularly suitable artificial kidney, its use as oxygenator is also contemplated.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A disposable blood dialyzer and a disposable system for recirculating dialysis fluid through the dialyzer, said dialyzer and system being adapted to be packaged, said dialyzer comprising a hollow core member, a housing enclosing the core member with a space therebetween, a semi-permeable membrane disposed about the core member and dividing the said space into a blood compartment and a compartment for dialysis fluid, an inlet means and an outlet means for flow of fluid into and out of the compartment for dialysis fluid, a first continuous tube connecting the said inlet means with the said outlet means externally of the housing and adapted for cooperation with a tubing pump to recirculate dialysis fluid through the compartment for dialysis fluid, a second tube connected to the first tube at said inlet for introducing fresh dialysis fluid to the system, a third tube connected to the first tube at said outlet for removing dialysis fluid from the system, means for flow of blood into the blood compartment and means for flow of blood from the blood compartment.

2. The dialyzer and recirculating system of claim 1 wherein said second and third tubes have free ends for connecting them to a source of fresh dialysis fluid and discharge of fluid from the system, respectively, and means for coupling the free ends together to facilitate packaging of the dialyzer and recirculating system.

3. The dialyzer of claim 1 wherein a constriction is provided in the said tube.

* * * * *